United States Patent
Mastry

(10) Patent No.: US 6,462,297 B1
(45) Date of Patent: Oct. 8, 2002

(54) SPOT-WELDED INTERCONNECTION AND METHOD OF WELDING ELECTRICAL TABS

(75) Inventor: Jason Alan Mastry, Duluth, GA (US)

(73) Assignee: Motorola, Inc., Schaumburg, IL (US)

( * ) Notice: Subject to any disclaimer, the term of this patent is extended or adjusted under 35 U.S.C. 154(b) by 34 days.

(21) Appl. No.: 09/709,874

(22) Filed: Nov. 10, 2000

(51) Int. Cl.$^7$ .............................................. B23K 11/11
(52) U.S. Cl. ................... 219/56.22; 219/117.1
(58) Field of Search ........................... 219/56.22, 56.21, 219/93, 117.1; 174/84 C

(56) References Cited

U.S. PATENT DOCUMENTS

| | | | |
|---|---|---|---|
| 3,519,778 A | * | 7/1970 | Gibson, Jr. .............. 219/56.22 |
| 3,523,173 A | * | 8/1970 | Lull .......................... 219/56.22 |
| 4,873,411 A | * | 10/1989 | Saen et al. ..................... 219/93 |
| 5,504,275 A | * | 4/1996 | Scramoncin .............. 174/84 C |
| 5,593,604 A | * | 1/1997 | Beasley et al. .......... 219/56.22 |
| 6,054,668 A | * | 4/2000 | Van Otteren et al. ......... 219/93 |

* cited by examiner

Primary Examiner—Clifford C. Shaw
(74) Attorney, Agent, or Firm—Philip J. Burrus, IV

(57) ABSTRACT

A spot-welded interconnection and method for welding a first conductive tab and second conductive tab together. Each tab is generally planar and the first tab includes a bendable extension. To form the interconnection, the tabs are placed such that the planes of the tabs are in substantially parallel and touching alignment, and then the extension of the first tab is bent around the second tab such that the bent extension is in substantially parallel and touching alignment with the second tab. The first tab, the second tab, and the bent extension are then spot-welded together at one or more locations where the first tab conductively touches the second tab, and where the second tab conductively touches the bent extension. The completed spot-welded interconnection can conduct a predetermined amount of current therethrough without the use of a copper spoon or other conductive material in the interconnection.

5 Claims, 2 Drawing Sheets

SPOT-WELDED INTERCONNECTION AND METHOD OF WELDING ELECTRICAL TABS

TECHNICAL FIELD

This invention relates generally to the welding of metal components. More particularly, the present invention relates to a spot-welded interconnection method of two or more conductive tabs.

BACKGROUND

The preferred method of mechanically and permanently joining two pieces of sheet metal tab stock for electrical connections in batteries and other electronic devices is resistance spot welding. Currently, copper spoons are used in production welding to join two thin metal tabs together by spot-welding the tabs and spoon to make a satisfactory electrical connection between the tabs. To reliably join two tabs in a parallel weld to form a conductive interconnection, a third layer of conductive material, such as copper, is required to shunt the proper amount of current through the two tabs being joined to form a structurally-sufficient weld nugget.

The use of the spoon in welding the tabs together causes several difficulties in the manufacturing process. The created spot-weld is not particularly strong, i.e. the tabs can be pulled apart fairly easily, and the breaking of the weld will open an electrical circuit. Further, using a spoon in the welding process adds an additional opportunity for error and requires manufacturing personnel to align the tabs and place copper spoon between the tabs while keeping them aligned during the welding process, which thus increases manufacturing time.

Moreover, it is common to weld the tabs and spoon by hand with a welding device and the error rate from human operation increases the likelihood of an improper weld. The weld itself is a difficult one to make as most welding devices use electrodes to weld, and in welding the tabs and spoon, the electrodes have a tendency to stick to the tabs and spoon after the weld is made, which makes the removal of the electrodes from the weld a delicate process without deleteriously affecting the weld. Furthermore, a "cold" weld will occur if the operator forgets to use the spoon, and this will provide a connection that does have adequate mechanical joint strength. There is also an increased probability of a completely unsatisfactory weld if the operator incorrectly aligns the tabs and spoon immediately prior to welding, and in such case, the tabs and spoon can be destroyed or rendered completely unusable by the failed weld attempt.

A further problem is that once the weld is made with the copper spoon, the spoon requires maintenance to prevent corrosion and deterioration. If the spoon is allowed to deteriorate, the electrical connection will be broken over time and this shortens the life of the battery or electrical device that the welded tabs are part of.

Accordingly, it would be advantageous to use a method to weld a pair of electrical tabs together that does not require the use of a spoon, or conductive material. It would also be advantageous for such method to use a simplified weld whereby the weld can either be accomplished through and automated process or very easily by a person. It is to the provision of such an improved method of spot-welding a pair of conductive tabs together that the present invention is primarily directed.

DETAILED DESCRIPTION OF THE INVENTION

Figure 1:
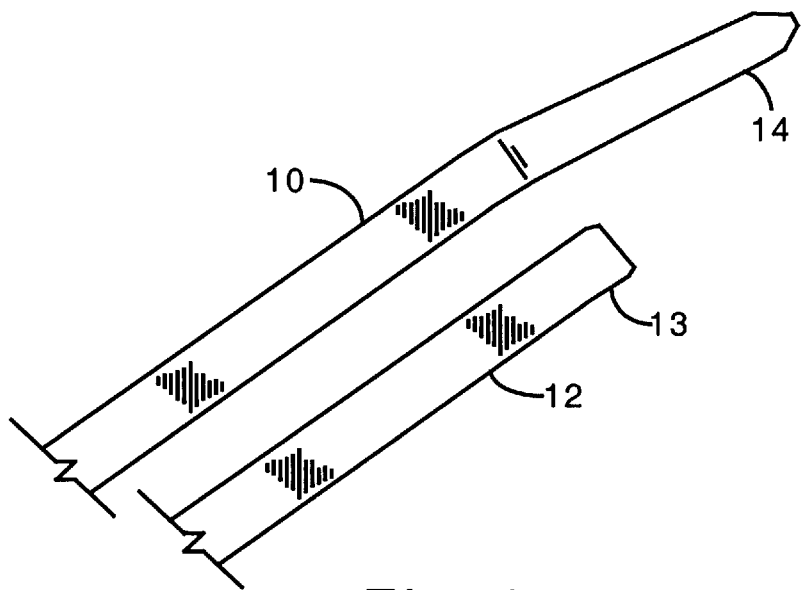
FIG. 1 is a perspective view of a first embodiment of the invention with a first and second conductive tabs where the bendable extension of the first tab is extending beyond the end of the second tab.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

FIG. 1 is a perspective view of the first embodiment of the present invention with the first conductive tab 10 having a bendable extension 14 and a second conductive tab 12 having an end 13 thereof. The tabs 10 and 12 are preferably simple metal conductive tabs as are known to join electrical components together such as in batteries and electronic devices. The tabs 10 and 12 as shown here are generally planar, and are 0.005 of an inch of steel sheet, but can alternately be made of any conductive material with the thickness and shape of the tab dictated by the intended use. The first tab 10 has a rounded bendable extension which is placed beyond the end 13 of the second tab 12. The end 13 of the second tab here is preferred to be flat (as opposed to rounded) so that the end 13 makes more conductive contact with the first tab 10 when the spot-welded interconnection is made.

Figure 2:
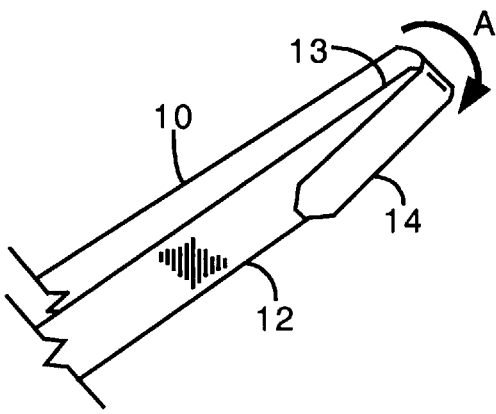
FIG. 2 is a perspective view of the first embodiment with the bendable extension of the first tab being bent around the end of the second tab.

In making the spot-welded interconnection of the tabs 10 and 12, as is shown in FIG. 2, the first tab 10 and second tab 12 are placed in alignment such that the planes of the tabs 10 and 12 are in substantially parallel and touching alignment, with the extension 14 extending beyond the end 13 of the second tab 12. The extension 14 should extend beyond the end 13 sufficiently enough that once the extension 14 is bent over, an adequate amount of the extension 14 will touch the opposite side of the second tab 13 to conduct the desired amount of current. In common electrical tabs, normally 0.25 of an inch of the extension extending beyond the end 13 is sufficient for most electrical applications. The key factor is that the completed spot-welded interconnection not provide too much resistance to the flowing electrical current such that it may heat up and destroy itself, harm other electrical components in the battery or electrical device, or cause an unsafe condition. Thus, the conductive contact desired between the first tab 10, second tab 12, and extension 14 will vary in accord with the desired amount of current conducted by the completed spot-welded interconnection.

The extension is then bent around the end 13 of the second tab 12 such that the bent extension 14 is in substantially parallel and touching alignment with the side of the second tab 12 opposite the first tab 10, as shown in the direction of arrow A. While the extension 14 is shown here as bent around the end 13 of the second tab 12, the extension 14 could be bent around the second tab 12 at any midpoint of the second tab 12 as long as a sufficient amount of conductive contact between the first tab 10, second tab 12, and extension 14 is made for the anticipated load to be conducted through the fully assembled interconnection. In "sandwiching" the second tab 12 between the first tab 10 and extension 14, the extension 14 acts as a permanently built-in spoon for the parallel resistance spot welding interconnection by allowing the proper amount of current to shunt through the two tabs 10 and 12. Further, the flat end 13 of the second tab 12 should abut the curve created by the bent extension 14 so as to make maximum contact with the planar body of the first tab 10 to increase conductivity between the tabs 10 and 12.

Figure 3:
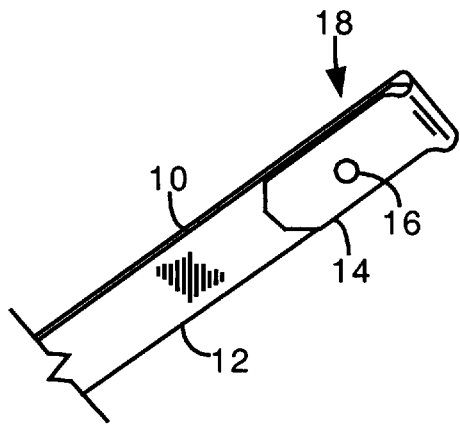
FIG. 3 is a perspective view of the first embodiment of the completed spot-welded interconnection of the first tab, second tab, and the bent extension.
Figure 4:
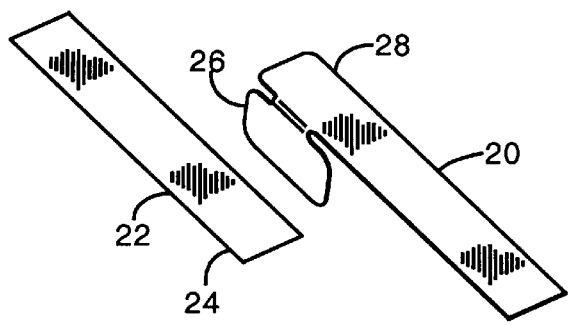
FIG. 4 is a perspective view of a second embodiment of the invention with a first tab and second tab with the bendable extension dependent from the side of the first tab.

With reference to FIG. 3, once the extension 14 is in substantially parallel alignment with the second tab 12 to "sandwich" the second tab 12 between the first tab 10 and extension 14, the first tab 10, the second tab 12, and the bent extension 14 are spot-welded together, as shown at the point of spot-welding 16. The spot-welded interconnection 18 then can effectively conduct electricity between the tabs 10 and 12. Even though the spot-welded interconnection 18 is shown as held together by a single spot-weld 16, the tabs 10 and 12 and extension 14 can be welded in more than one location to insure an adequate amount of fixation between the tabs 10 and 12 for a sturdy interconnection.

Furthermore, the first tab 10, second tab 12, and extension 14 are preferably welded near the bend in the extension 14 and the end of the second tab 13. The welding of the first tab 10, second tab 12, and extension 14 near the bend is preferred as it makes a solid weld that can withstand significant force exerted on the tabs without pulling them apart and breaking the welded interconnection. In experiments with spot-welded interconnections that were formed in the manner disclosed herein, the pull-strength mean, i.e. the mean amount of force that is required to break the weld, is 14.26 lbs. For purposes of comparison, the general specification for electrical tab welds using a spoon is only 6 lbs. of resistance in most applications. The spot-welded interconnection 18 is therefore much sturdier of a connection than the prior art weld using a spoon.

Figure 5:
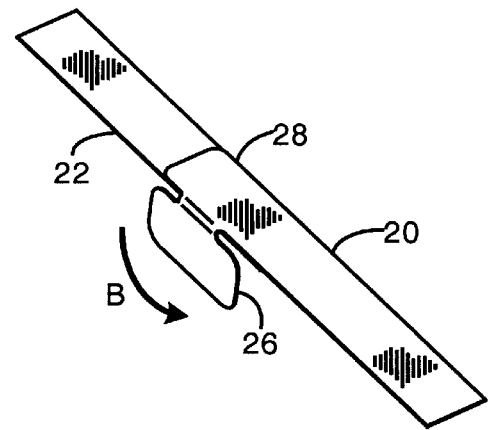
FIG. 5 is a perspective view of the second embodiment with the first tab and second tab in substantially parallel and touching alignment, with the bendable extension being bent around the second tab.

FIGS. 4–7 illustrate a second embodiment of the first tab 20 and second tab 22 forming a second embodiment of the spot-welded interconnection 32. In the second embodiment, the first tab 20 has a bendable extension 26 dependent from the side of the end 28 of the first tab 20, and the end 28 of the first tab 20 is placed in contact with the end 24 of the second tab 22 such that the first tab 20 and second tab 22 are in substantially parallel and touching alignment, as is shown in FIG. 5. In the preferred alignment, the bendable extension 26 is then bent, in the direction of arrow B, such that the extension 26 sandwiches the end 24 of the second tab 22 between the extension 26 and end 28 of the first tab 20. While the extension 26 is shown in FIG. 5 as being bent around the end 24 of the second tab 22, the bendable extension 26 can be bent around any portion of the second tab 22 to create the conductive spot-welded interconnection. Furthermore, more than one bendable extension 26 can be formed on the tab 20 so that more than one interconnection with other tabs can be made with the tabs 20.

Figure 6:
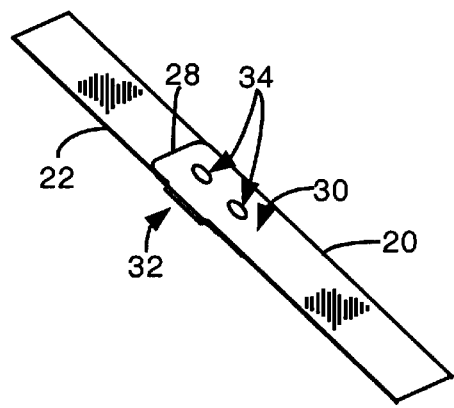
FIG. 6 is a perspective view of the top side of the second embodiment with the first tab and second tab spot-welded at two locations to form the second embodiment of the spot-welded interconnection.
Figure 7:
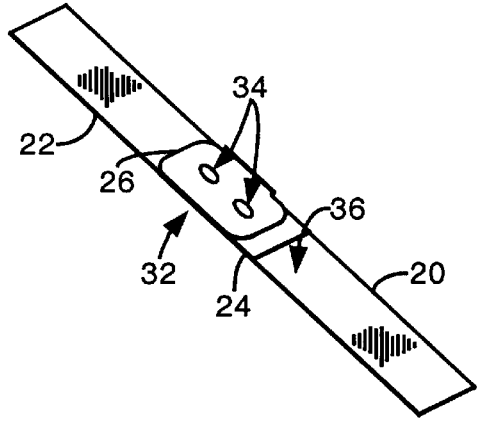
FIG. 7 is a perspective view of the bottom side the second embodiment of spot-welded interconnection of FIG. 6.

With reference to FIGS. 6 and 7, the second embodiment of the spot-welded interconnection 32 is formed with two spot-welds 34 that weld the first tab 20, second tab 22, and extension 26 together. In FIG. 6, the top side 30 of the second embodiment of the spot-welded interconnection 32 is shown with the two locations of spot-welding 34 on the end 28 of the first tab 20 illustrated. Conversely, in FIG. 7, the bottom side 36 of the spot-welded interconnection 32 is shown with the two locations of spot-welding 34 on the extension 26. As with the first embodiment, one or more than two locations can be spot-welded to hold the first tab 20, second tab 22, and extension 26 together.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A method of spot-welding at least a first conductive tab and a second conductive tab together, each tab being generally planar, and the first tab including at least one bendable extension, the method comprising the steps of placing the tabs such that the planes of the tabs are in substantially parallel and touching alignment;

bending at least one extension of the first tab around the second tab such that the bent extension is in substantially parallel and touching alignment with the second tab; and spot-welding the first tab, the second tab, and the bent extension together at one or more locations where the first tab conductively touches the second tab, and where the second tab conductively touches the bent extension.

2. The method of claim 1, wherein the step of welding the first tab, the second tab, and the bent extension together at one or more locations is welding the first tab, the second tab, and at least one bent extension together at one or more locations such that the welded interconnection can conduct a predetermined amount of current.

3. The method of claim 2, wherein the first tab, the second tab, and the bent extension are welded together at one or more locations is welding the welding the first tab, the second tab.

4. The method of claim 1, wherein the steps of the method are performed on a first conductive metal tab and second conductive metal tab.

5. A spot-welded interconnection of a pair of conductive tabs produced from the steps of any one of claims 1, 2, or 3.

* * * * *

UNITED STATES PATENT AND TRADEMARK OFFICE
CERTIFICATE OF CORRECTION

PATENT NO.       : 6,462,297 B1
DATED            : October 8, 2002
INVENTOR(S)      : Jason Alan Mastry It is certified that error appears in the above-identified patent and that said Letters Patent is hereby corrected as shown below:

<u>Title page,</u>
Item [74], *Attorney, Agent or Firm,* reads "Philip J. Burrus, IV" should read
-- Philip H. Burrus, IV --.

Signed and Sealed this

Seventh Day of October, 2003

JAMES E. ROGAN
*Director of the United States Patent and Trademark Office*